(12) United States Patent
Tomiyoshi et al.

(10) Patent No.: US 7,135,841 B1
(45) Date of Patent: Nov. 14, 2006

(54) EMULATED INDUCTOR CURRENT AUTOMATIC CORRECTION WITHOUT KNOWLEDGE OF ACTUAL INDUCTOR CURRENT RAMP FOR EMULATED PEAK CONTROL MODE PWM

(75) Inventors: Kenji Tomiyoshi, Cupertino, CA (US); George A. Hariman, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 85 days.

(21) Appl. No.: 10/985,477

(22) Filed: Nov. 10, 2004

(51) Int. Cl.
*G05F 1/613* (2006.01)

(52) U.S. Cl. ............................ 323/224; 323/268

(58) Field of Classification Search ........ 323/282–288, 323/290, 224; 363/44–48, 74, 80, 81, 89
See application file for complete search history.

(56) References Cited

U.S. PATENT DOCUMENTS

| | | | | |
|---|---|---|---|---|
| 5,428,267 | A * | 6/1995 | Peil | 315/224 |
| 6,377,032 | B1 * | 4/2002 | Andruzzi et al. | 323/224 |
| RE38,940 | E * | 1/2006 | Isham et al. | 323/224 |

OTHER PUBLICATIONS

U.S. Appl. No. 10/835,616, Tomiyoshi.
U.S. Appl. No. 10/703,960, Broach et al.
U.S. Appl. No. 10/780,375, Broach et al.
U.S. Appl. No. 10/780,207, Broach et al.
U.S. Appl. No. 10/861,872, Broach et al.
Robert W. Erickson and Dragan Maksimovic, Editors, *Fundamentals of Power Electronics*, pp. 439-487, 654-657, 834-839, 2nd Edition, Kluwer Academic Publishing, Norwell, Massachusetts, 2001.
Abraham I. Pressman, *Switching Power Supply Design*, pp. 143-165, 2nd Edition, McGraw Hill, New York, New York, 1998.
Raymond B. Ridley, "A New Continuous Time Model for Current-Mode Control," *IEEE Transaction on Power Electronics*, vol. 6, No. 2, Apr. 1991, pp. 271-280.

\* cited by examiner

*Primary Examiner*—Rajnikant B. Patel
(74) *Attorney, Agent, or Firm*—Darby & Darby PC; Matthew M. Gaffney

(57) ABSTRACT

Method and circuit for automatic correction of emulated inductor current without knowledge of actual inductor current ramp for an emulated current mode (ECM) PWM switching regulator. In an ECM-PWM switching regulator a compensation ramp component is usually added to an up-slope. An excess ramp component may also be added compared to actual inductor current. According to one embodiment of the present invention, an integrating negative feedback circuit is employed to reduce both extra components. According to another embodiment, a single integrating negative feedback loop is added to the ECM-PWM regulator to retain the compensation ramp component while reducing the excess ramp component. According to a further embodiment, excess ramp component is reduced by adding the integrating negative feedback loop at an end stage of the circuit. Finally, the feedback loop with two duplicate track-and-hold circuitry may be added to reduce the excess ramp component, while retaining the compensation component.

22 Claims, 10 Drawing Sheets

EMULATED INDUCTOR CURRENT AUTOMATIC CORRECTION WITHOUT KNOWLEDGE OF ACTUAL INDUCTOR CURRENT RAMP FOR EMULATED PEAK CONTROL MODE PWM

FIELD OF THE INVENTION

The present invention relates to power supplies and more specifically to a Pulse Width Modulation (PWM) switching regulator with compensated slope and continuous current ramp.

BACKGROUND

Advances in one area of technology often require commensurate advances in supporting technologies to realize the full benefit of the advance. For example, observers of the microprocessor industry are familiar with "Moore's Law," which posits that the complexity of semiconductor devices doubles every two years. Microprocessor development arguably represents the most dramatic illustration of Moore's Law. Pioneering microprocessors released in the 1970's operated at clock speeds well under 500 KHz, and included fewer than five thousand transistors. Modern microprocessors operate at clock speeds in excess of 1 GHz and include millions of transistors. Exploiting these dramatic gains required advances in a host of supporting technologies, from advances in memory technology and circuit fabrication, to advances in power supply design.

Indeed, modern microprocessors could not provide their dramatic performance gains absent today's sophisticated power supplies. For example, high-end microprocessors can consume in excess of 80 Watts of power and operate at 2 VDC or less. These requirements translate into power supply output current requirements in excess of 40 Amps, yet the power supply must maintain tight output voltage regulation, even when faced with dramatic step changes in output current. In general, modern electronic systems require responsive power supplies capable of providing relatively clean power at well-controlled voltages, over a wide range of quickly changing load conditions.

Linear regulators are relatively responsive, accurate, and low noise. Such regulators operate using controlled impedance, typically implemented as a pass transistor, to create a voltage drop across the controlled impedance such that the input voltage minus the voltage drop equals a desired output voltage. With proper use of load capacitors, linear regulators offer good line and load regulation performance, with virtually no noise problems. However, linear regulators are inefficient when required to regulate to an output voltage significantly below their input voltage. Because of high currents required by modern electronic systems, main power supplies often operate at 12 VDC or 24 VDC. Regulating such primary voltages down to 2 VDC, or even 5 VDC, for high-current loads is impractical using linear regulation.

Switch-mode power supplies offer significant efficiency advantages compared to linear regulation, and avoid most of the power dissipation problems associated with linear regulators. Switch-mode power supplies operate, as their name suggests, by switching some type of reactive element in and out of a supply path to effect output voltage control. The reactive elements may be one or more capacitors, such as in a charge-pump type switcher. However, inductor-based switch-mode power supplies are more common in high-current, high-performance power supply applications. Typically, an inductor is switch-connected to a voltage source at one end, and to an output load at the other end. An output capacitor sits in parallel with the output load. A switch controller rapidly connects and disconnects the inductor to the voltage supply to regulate the load voltage. The output capacitor serves as a low-impedance current source to the load, and helps smooth the output voltage of the power supply.

The switch controller in a switch-mode power supply requires some form of feedback to effect closed loop voltage regulation on the load. Many different regulation topologies exist, including voltage-mode feedback and current-mode feedback. In both voltage-mode and current mode feedback, an error amplifier typically generates a control signal by amplifying a difference between a feedback signal and a reference signal. This error amplification can reduce the bandwidth of the feedback loop, diminishing the switch controller's ability to respond to highly dynamic load changes, as are common with microprocessors and other high-performance electronic circuits.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is related to a method and circuit for automatic correction of emulated inductor current without knowledge of actual inductor current ramp for an emulated current mode PWM switching regulator. In an emulated current mode PWM switching regulator, like a regular peak current mode control PWM switching regulator, a compensation ramp component is usually added to an up-slope current to prevent a sub-harmonic oscillation for duty cycles greater than fifty percent. Furthermore, an excess ramp component may also be added to the emulated inductor current compared to actual inductor current. According to one embodiment of the present invention, an integrating negative feedback circuit may be employed to reduce both extra components. According to another embodiment, a single integrating negative feedback loop is added to the emulated current mode PWM regulator to retain the compensation ramp component while reducing the excess ramp component. According to a further embodiment, excess ramp component is reduced by adding the integrating negative feedback loop at an end stage of the circuit. According to a yet another embodiment, the feedback loop with two duplicate track-and-hold circuitry may be added to reduce the excess ramp component, while retaining the compensation component.

While a preferred embodiment of the present invention may be implemented in a single-phase current mode PWM switching regulator circuit, the invention is not so limited. The described circuit may be employed as part of virtually any current mode PWM switching regulator circuit known to those skilled in the art.

Figure 1:
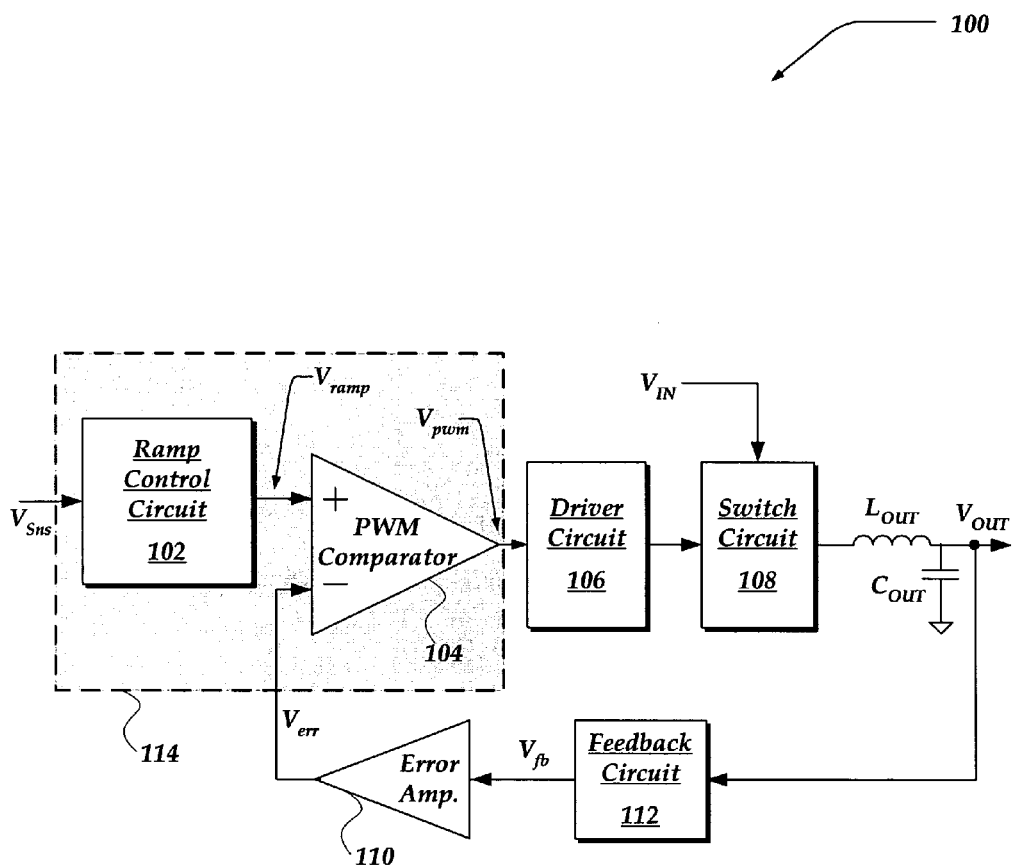
FIG. 1 illustrates a block diagram of an embodiment of a current mode PWM switching regulator circuit in which the present invention may be practiced.

FIG. 1 illustrates a block diagram of an embodiment of current mode PWM switching regulator 100 in which the present invention may be practiced. Current mode PWM switching regulator 100 includes pulse width modulator circuit 114, driver circuit 106, switch circuit 108, feedback circuit 112, and error amplifier 110. Pulse width modulation circuit 114 includes ramp control circuit 102 and PWM comparator 104.

One approach to controlling a switching power regulator, such as a PWM switching regulator, is employing an emulated peak current mode control. Unlike peak current mode control where an up-slope inductor current is sensed through a voltage drop across a top-side FET, the emulated peak current mode control employs sensing a down-slope inductor current through a voltage drop across a bottom-side FET of the switching regulator. Following the sensing of the down-slope inductor current, an approximate up-slope current value may be determined using $$\frac{di_L}{dt} = \frac{V_{in} - V_{out}}{L},$$

where $i_L$ is the inductor current, L an inductance of the inductor, and $V_{in}$ and $V_{out}$ the input and output voltages of the FET switches.

In the above described approach, a value of the inductor may not always be available due to the inductor commonly being an off-chip component, the inductor value being user-selectable, a limited pin availability of a chip comprising the switching regulator, and the like. Generally, the inductance of the inductor may be determined based on a pre-selected switching frequency of the regulator (i.e. the inductance chosen such that a ripple of the inductor current in a buck regulator is no more than 30% of a maximum load current). However, this rule of thumb may not always be valid. Therefore, a value of the up-slope emulated inductor current is determined to be larger than an up-slope actual inductor current.

If the up-slope emulated inductor current is less than the up-slope actual inductor current, a sub-harmonic oscillation condition may be inadvertently initiated. In a typical emulated current mode PWM switching regulator, the up-slope emulated inductor current is, therefore, predetermined much larger than the up-slope actual inductor current (i.e. 3 times or larger).

Moreover, emulated current mode PWM switching regulators typically include a small current component called compensation ramp that is added to the up-slope emulated inductor current to ensure the up-slope current is always larger than the down-slope current. This addition ensures that sub-harmonic oscillation occurs only if a duty cycle of the circuit is more than 50%.

Figure 10:
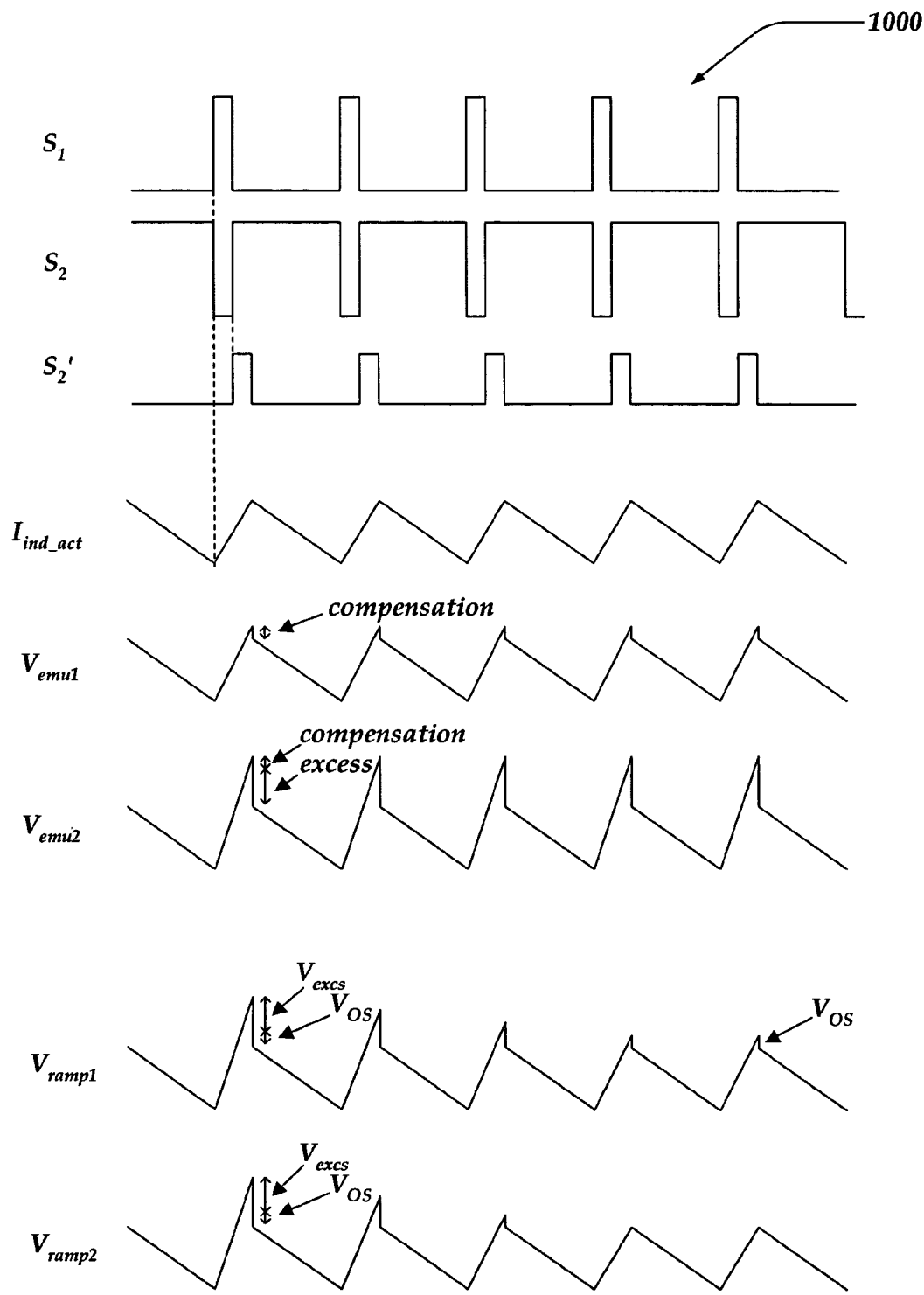
FIG. 10 illustrates a timing diagram of various waveforms involved in an operation of a ramp control circuit such as the ramp control circuit of FIG. 1.

Having an excess ramp component and a compensation component, a sum of which may reach 5 times of more of the actual inductor current, may result in a switching of the PWM regulator behavior from a current control mode to a voltage control mode. The voltage control mode may be more difficult to compensate employing a transconductor type error amplifier leading to more complicated circuitry. A comparison of current waveforms between an uncorrected and a corrected PWM switching regulator is shown in FIG. 10.

The excess and compensation components may be reduced by either subtracting the excess and compensation up-slope ramp components or by reducing the emulated up-slope current ramp at a predetermined ratio to eliminate the extra components. Both operations may be accomplished by employing a negative feedback loop around the emulation system to integrate the error out. However, as described previously, the compensation up-slope component may be retained to avoid sub-harmonic oscillations, which may be accomplished by positioning the negative feedback loop appropriately in relation to the emulation system or by adding an offset component that is equivalent to the compensation up-slope component.

Pulse width modulation circuit 114 is arranged to provide a control signal to driver circuit 106 based on pulse width modulation. To perform its operation, pulse width modulation circuit 114 is arranged to receive an output of error amplifier 110, $V_{err}$, and sensed voltage $V_{Sns}$. $V_{Sns}$ may be determined across a switch element, such as a MOSFET transistor, of switch circuit 108 to sense the inductor current. Ramp control circuit 102, in response to $V_{Sns}$, is arranged to provide a ramp voltage $V_{ramp}$ to a non-inverting input of PWM comparator circuit 104.

PWM comparator circuit 104 is arranged to receive $V_{ramp}$ and error voltage $V_{err}$ from error amplifier 110 and provide PWM voltage $V_{pwm}$ to driver circuit 106. $V_{pwm}$ is arranged to control an output of PWM switching regulator based on a feedback loop comprising feedback circuit 112 and error amplifier 110. Feedback circuit 112 is arranged to receive $V_{OUT}$ and provide a portion of $V_{OUT}$ as $V_{fb}$ to error amplifier 110. Error amplifier 110 is arranged to provide $V_{err}$ based on $V_{fb}$ to an inverting input of PWM comparator 104.

Driver circuit 106 is arranged to receive $V_{pwm}$ from PWM comparator 104 and control, in response to the output of PWM comparator 104, switch circuit 108. In a multiple phase PWM switching regulator, driver circuit 106 may include multiple control circuits.

Switch circuit 108 may include step-down-switch-mode power supply (SMPS) drivers. Input voltage $V_{IN}$ is provided to switch circuit 108, which may comprise a MOSFET transistor that is arranged to operate as a regulating switch. In one embodiment, where more than one phase may be employed for multiplexing, more than one driver may be implemented. Switch circuit 108 is arranged to provide a regulated output voltage to output inductor $L_{OUT}$ and output capacitor $C_{OUT}$, which is arranged to provide output voltage $V_{OUT}$ to a load circuit.

FIG. 1 shows a particular arrangement of inputs and outputs of the various components. In one embodiment, all of the components of PWM switching regulator 100 may be included in the same chip. Alternatively, one or more of the components may be off-chip.

Figure 2:
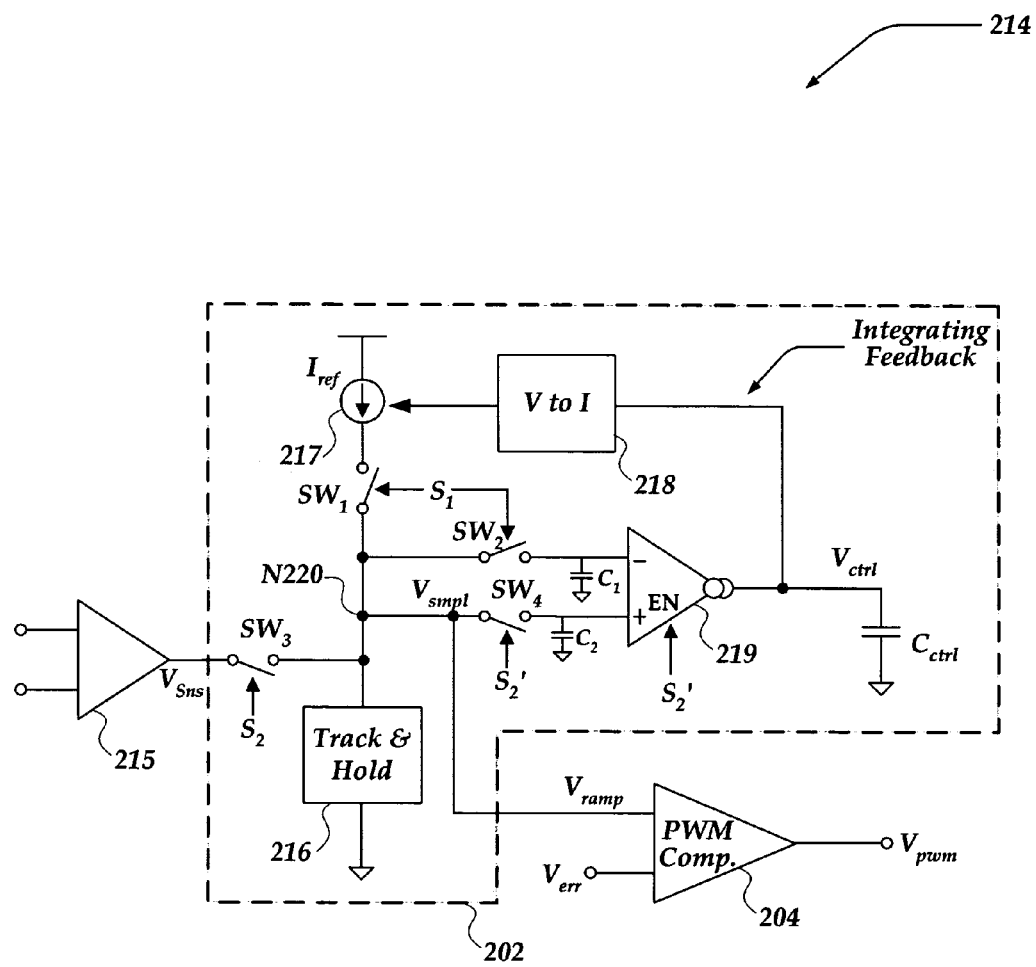
FIG. 2 illustrates a block diagram of one embodiment of a ramp control and PWM comparator circuit of FIG. 1.

FIG. 2 illustrates a block diagram of one embodiment of ramp control and PWM comparator circuit 214. Ramp control and PWM comparator circuit 214 may be implemented as part of current mode PWM switching regulator 100 of FIG. 1. Ramp control and PWM comparator circuit 214 includes low side FET current sense amplifier 215, which is arranged to provide a sensed voltage $V_{sns}$, ramp control circuit 202, and PWM comparator 204.

PWM comparator 204 is arranged to provide $V_{pwm}$ based on a comparison of $V_{ramp}$ and $V_{err}$ as described above in conjunction with FIG. 1. Amplifier 215 represents a sensing circuit that is arranged to sense an inductor current across a switching element of switch circuit 108 of FIG. 1, and provide sensed voltage $V_{Sns}$ to ramp control circuit 202.

Ramp control circuit 202 includes current controlled reference current source 217, voltage-to-current converter 218, switches $SW_1$–$SW_4$, transconductance amplifier 219, control capacitor $C_{ctrl}$, and track-and-hold circuit 216.

In an operation, switches $SW_1$, $SW_2$ and $SW_3$ are activated by non-overlapping signals $S_1$ and $S_2$ corresponding to on-time and off-time durations of the switching regulator, respectively. Switch $SW_4$ is operated by $S_2'$, which is based on $S_2$ processed through a one-shot trigger circuit. When $SW_1$ and $SW_2$ close, track-and-hold circuit 216 is charged by reference current $I_{ref}$ provided by current controlled reference current source. $I_{ref}$ provides emulated up-slope current. In one embodiment, track-and-hold circuit 216 may include a sampling capacitor. A voltage sampled by the sampling capacitor, $V_{smpl}$, is also provided to an inverting input of transconductance amplifier 219 when $SW_2$ is closed.

Shortly after $SW_1$ and $SW_2$ are opened, $SW_3$ and $SW_4$ are closed based on $S_2$ and $S_2'$, respectively. Closing of $SW_3$ provides to track-and-hold circuit 216 sensed voltage $V_{Sns}$, which is commonly across one of the switch elements (such as a MOSFET) of the switch circuit of the current mode PWM switching regulator. $V_{Sns}$ provides a voltage that corresponds to down-slope portion of the actual inductor current.

At a rising edge of $S_2$, a one-shot trigger circuit is arranged to provide $S_2'$ to $SW_4$ and close that switch. When $SW_4$ is closed, During a duration of the one-shot pulse $S_2'$, a beginning of the down-slope voltage is sampled and provided to a non-inverting input of transconductance amplifier 219. Also, during the same period, transconductance amplifier 219 compares the voltages at its inputs and either increases or decreases a current at its output based on a difference of the input voltages. A voltage generated by the output current of transconductance amplifier charging or discharging control capacitor $C_{ctrl}$ is control voltage $V_{ctrl}$.

Voltage-to-current converter 218 is arranged to control reference current source 217 based on $V_{ctrl}$. Voltage-to-current converter 218 may adjust the emulated up-slope current by either subtracting a predetermined amount or changing a peak ratio based on the feedback from transconductance amplifier 219.

After several clock cycles, the negative feedback loop may adjust the emulated up-slope current such that $V_{smpl}$, thereby $V_{ramp}$, includes substantially reduced excess upslope and compensation up-slope components.

Figure 3:
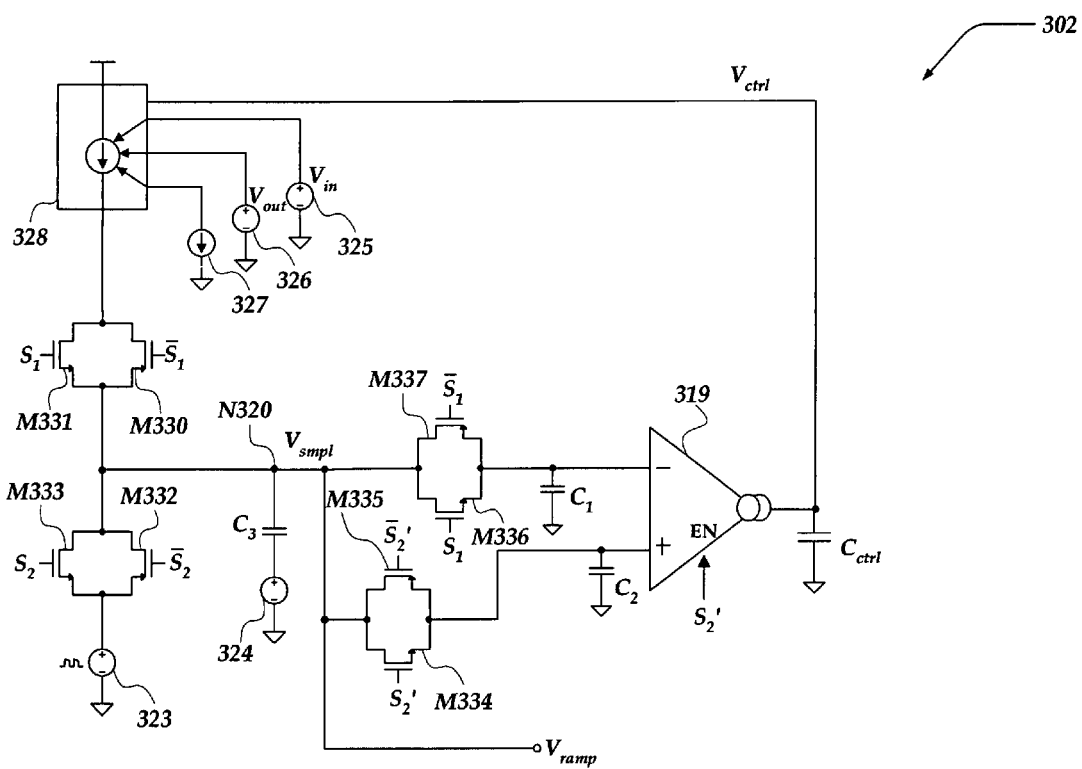
FIG. 3 schematically illustrates one embodiment of the ramp control circuit of FIG. 2.

Track-and-hold circuit 216, transconductance amplifier 219, and voltage-to-current converter 218 may be implemented in a number of ways known to those skilled in the art. One such exemplary embodiment is illustrated in FIG. 3. In one embodiment of transconductance amplifier 219, control capacitor $C_{ctrl}$ may be included in the transconductance amplifier.

FIG. 3 schematically illustrates ramp control circuit 302, which is one embodiment of ramp control circuit 202 of FIG. 2 ramp control circuit 302 includes current sources 328 and 327, voltage sources 325, 326, 323, and 324, transistors, M330–M337, capacitors $C_1$–$C_3$, and transconductance amplifier 319.

Transistors M330 and M331 are arranged to operate as switch $SW_1$ of PWM controller circuit 202 of FIG. 2 in response to trigger signal $S_1$. Transistors M332 and M333 are arranged to operate as switch $SW_3$ of PWM controller circuit 202 of FIG. 2 in response to trigger signal $S_2$. Transistors M336 and M337 are arranged to operate as switch $SW_2$ of PWM controller circuit 202 of FIG. 2 in response to trigger signal $S_1$. Finally, transistors M334 and M335 are arranged to operate as switch $SW_4$ of PWM controller circuit 202 of FIG. 2 in response to trigger signal $S_2'$.

Voltage source 323 represents a voltage sense circuit providing $V_{Sns}$ to ramp control circuit 302 from a switch circuit of current mode PWM switching regulator based on an down-slope actual inductor current. Capacitor $C_3$ and voltage source 324 are arranged to operate as track-and-hold and sampling circuits of ramp control circuit 202 of FIG. 2. A sampled voltage at node 320, where $C_3$ is coupled, is $V_{smpl}$, which is provided to an inverting input of transconductance amplifier 319 when switch $SW_4$ is closed.

Capacitors $C_1$ and $C_2$ are additional track and hold capacitors at the non-inverting and inverting inputs of transconductance amplifier 319, respectively. As shown in FIG. 2, ramp voltage $V_{ramp}$ is the same voltage as $V_{smpl}$, and is provided to an input of PWM comparator along with error voltage $V_{err}$.

Controlled current source 328 is arranged to receive control voltages $V_{ctrl}$, $V_{out}$, and $V_{in}$, and provide emulated inductor current $I_{ref}$ to a non-inverting input of transconductance amplifier 319 when switches $SW_1$ and $SW_2$ are closed. Voltage sources 325 and 326 are arranged to provide a current that is proportional to Vin-Vout. Current source 327 is arranged to provide a DC current to controlled current source 328. Controlled current source 328 along with voltage sources 325 and 326, and current source 327 is arranged to operate as a combination of voltage-to-current converter 218 and reference current source 217 of FIG. 2.

An operation of ramp control circuit 302 is essentially the same as described above in conjunction with FIG. 2. The transistor pairs M330–M331, M336–M337, M332–M333, and M334–M335 are arranged to turn on and act as a closing switch based on $S_1$, $S_2$, and $S_2'$, respectively.

When $SW_3$ and $SW_4$ are closed based on $S_2$ and $S_2$', respectively, a beginning of the down-slope voltage is sampled and provided to the non-inverting input of transconductance amplifier 319. Also, during $S_2$', transconductance amplifier 319 compares the voltages at its inputs and either increases or decreases a current at its output based on a difference of the input voltages. $V_{ctrl}$ generated by the output current of transconductance amplifier charging or discharging control capacitor $C_{ctrl}$ is provided to controlled current source 328 for adjusting an up-slope of emulated inductor current and thereby substantially reducing the compensation up-slope component and the excess up-slope component.

FIG. 3 shows one embodiment of ramp control circuit 302. However, the invention is not limited to the exemplary circuit described above. Other embodiments may be implemented without departing from the spirit and scope of the invention. Moreover, FIG. 3 shows a particular arrangement of various components of ramp control circuit 302. In one embodiment, all of the components of ramp control circuit 302 may be included in the same chip. Alternatively, one or more of the components may be off-chip.

Figure 4:
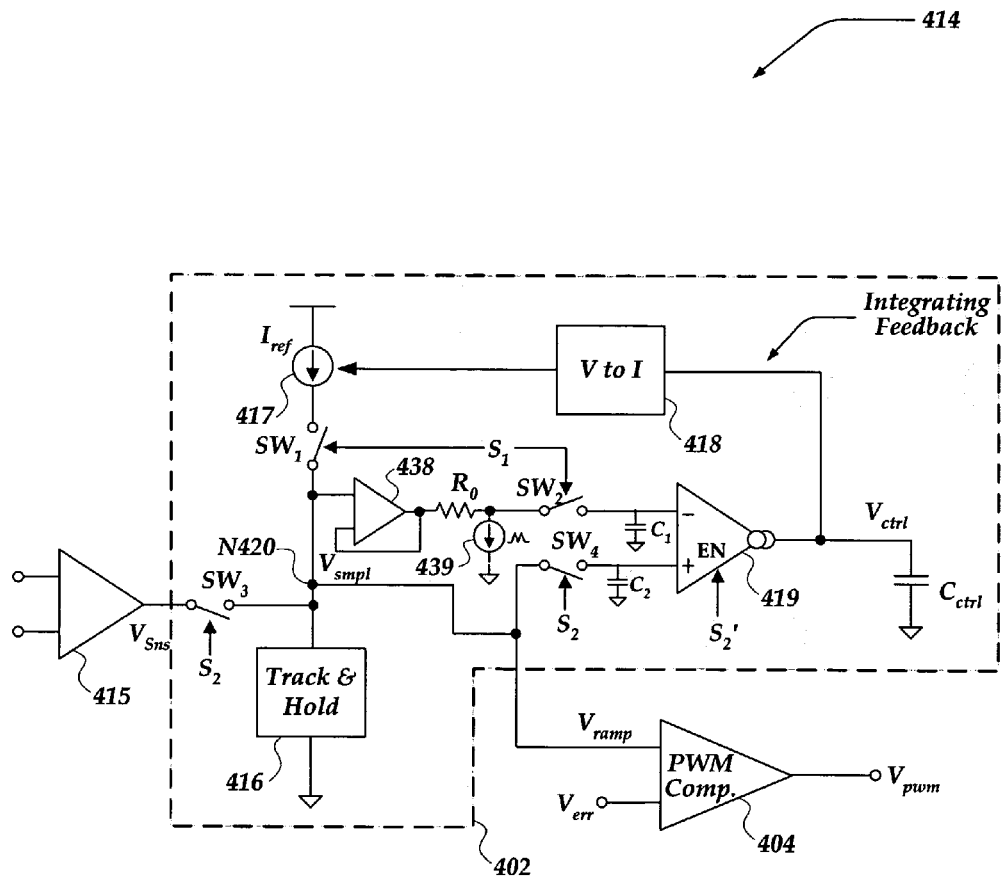
FIG. 4 illustrates a block diagram of another embodiment of the ramp control and PWM comparator circuit of FIG. 1.

FIG. 4 illustrates a block diagram of another embodiment of ramp control and PWM comparator circuit 414. Ramp control and PWM comparator circuit 414 may be implemented in current mode PWM switching regulator 100 of FIG. 1. Ramp control and PWM comparator circuit 414 includes inductor current sense amplifier 415, which is arranged to provide the sensed voltage, ramp control circuit 402, and PWM comparator 404.

Components of Ramp control and PWM comparator circuit 414 shown in FIG. 4 that are similarly named in FIG. 2 operate in substantially the same way as discussed above. Ramp control circuit 402 includes, additionally, an offset circuit comprising buffer circuit 438, resistor $R_0$, and current source 439.

An input of buffer circuit 438 is coupled to node 420, where switch $SW_1$, switch $SW_3$, and track-and-hold circuit 416 are coupled. An output of buffer circuit 438 is coupled to one terminal of resistor $R_0$. Another terminal of resistor $R_0$ is coupled through switch $SW_2$ to an inverting input of transconductance amplifier 419. Current source 439 is coupled between the other terminal of resistor $R_0$ and a ground. Current source 439 is arranged to provide a ramp current.

Ramp control circuit 402 is arranged to operate similarly to ramp control circuit 202 of FIG. 2. However, the offset circuit, which is coupled to the inverting input of transconductance amplifier 419, is arranged to subtract a voltage from the emulation voltage substantially equal to a compensation up-slope component. Buffer circuit 438 is arranged to prevent an effect of the subtraction on sampled voltage $V_{smpl}$ at a non-inverting input of transconductance amplifier 419 (parallel tracks).

As a result of the subtraction, transconductance amplifier 419 may receive an emulated up-slope peak that is smaller by the compensation up-slope component during a comparison of the voltages at its inputs. Accordingly, the integrating negative feedback loop may adjust the voltages at the inputs of transconductance amplifier 419 to be substantially equal, but $V_{smpl}$, will preserve the compensation up-slope component.

The subtraction may be accomplished by generating a voltage drop across the terminals of $R_0$ with the ramp current from current source 439. Current source 439 may be arranged to provide the ramp current with a substantially same frequency as a switching frequency of the PWM regulator. By pre-selecting a value of $R_0$ and a magnitude of the ramp current from current source 439, an amount of compensation up-slope component to be subtracted may be predetermined. Switch $SW_2$ then provides the subtracted emulation voltage to the inverting input of transconductance amplifier 419 based on first timing signal $S_1$.

After several clock cycles, the negative feedback loop and the offset circuit may adjust the emulated up-slope current such that $V_{smpl}$, thereby $V_{ramp}$, includes a substantially reduced excess up-slope component while retaining the compensation up-slope component $V_{OS}$.

Figure 5:
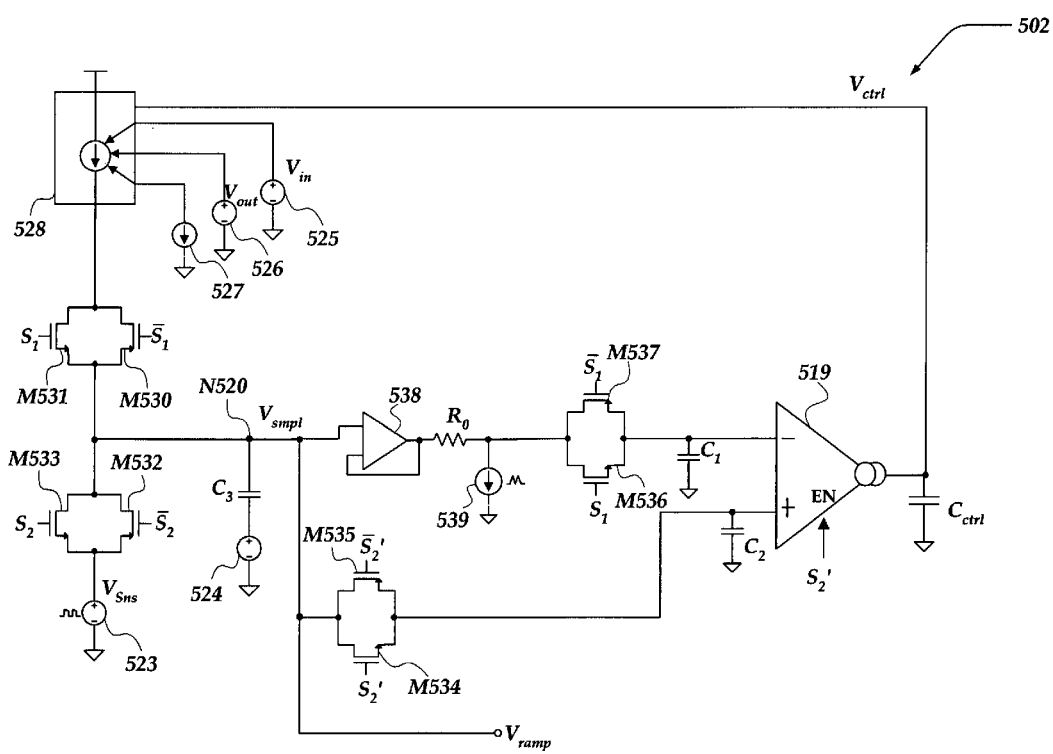
FIG. 5 schematically illustrates one embodiment of the ramp control circuit of FIG. 4.

FIG. 5 schematically illustrates ramp control circuit 502, which is one embodiment of ramp control circuit 402 of FIG. 4. ramp control circuit 502 includes current sources 528 and 527, voltage sources 525, 526, 523, and 524, transistors, M530–M537, capacitors $C_1$–$C_3$, and transconductance amplifier 519. Ramp control circuit 502 additionally includes an offset circuit comprising buffer circuit 538, resistor $R_0$, and current source 539.

Components of ramp control circuit 502 shown in FIG. 5 that are similarly named in FIG. 3 operate in substantially the same way as discussed above in conjunction with FIG. 3. Furthermore, an operation and an effect of the offset circuit comprising buffer circuit 538, resistor $R_0$, and current source 539 is described above in conjunction with FIG. 4.

FIG. 5 shows one embodiment of ramp control circuit 502. However, the invention is not limited to the exemplary circuit described above. Other embodiments may be implemented without departing from the spirit and scope of the invention. Moreover, FIG. 5 shows a particular arrangement of various components of ramp control circuit 502. In one embodiment, all of the components of ramp control circuit 502 may be included in the same chip. Alternatively, one or more of the components may be off-chip.

Figure 6:
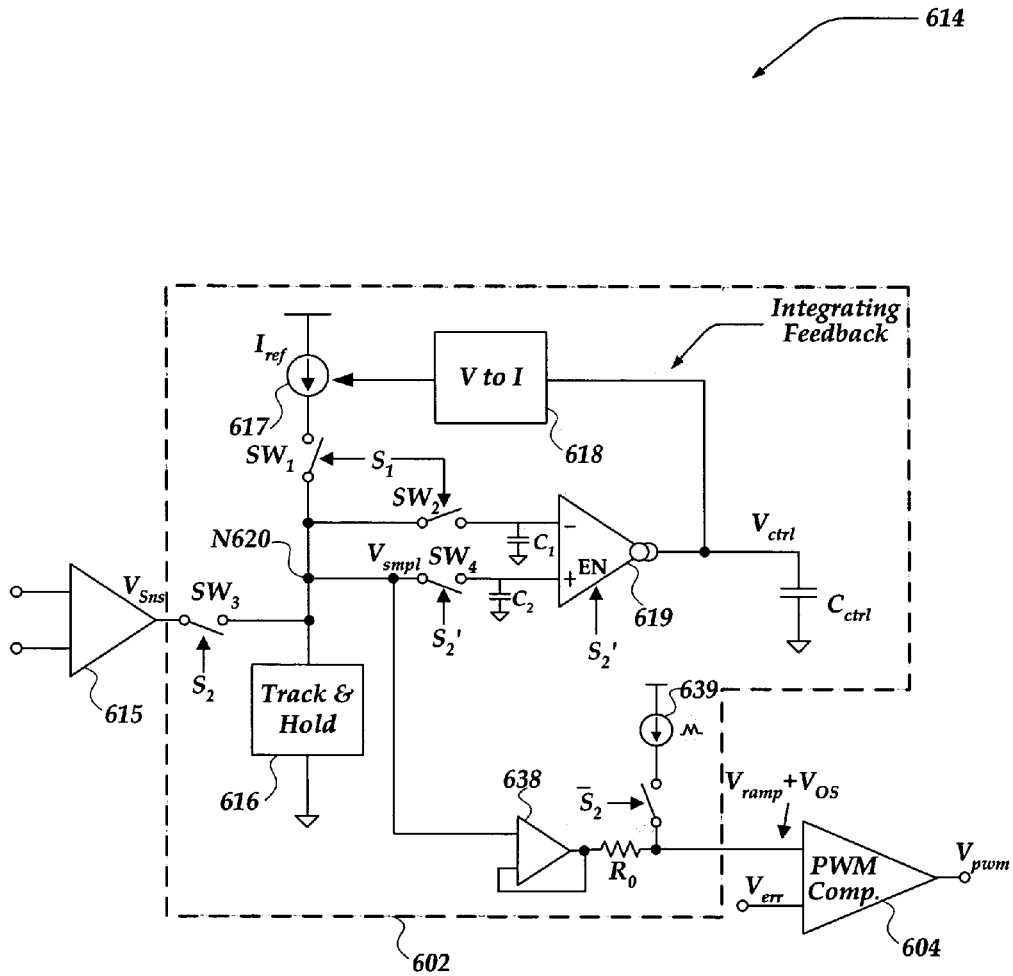
FIG. 6 illustrates a block diagram of a further embodiment of the ramp control and PWM comparator circuit of FIG. 1.

FIG. 6 illustrates a block diagram of a further embodiment of ramp control and PWM comparator circuit 614. Ramp control and PWM circuit 614 may be implemented in current mode PWM switching regulator 100 of FIG. 1. Ramp control and PWM comparator circuit 614 includes downslope inductore current sense amplifier 615, which is arranged to provide the sensed voltage, ramp control circuit 602, and PWM comparator 604.

Components of pulse width modulation circuit 614 and ramp control circuit 602 shown in FIG. 6 that are similarly named in FIG. 4 operate in substantially the same way as discussed above in conjunction with FIG. 4. ramp control circuit 602 includes, additionally, an offset circuit comprising buffer circuit 638, resistor $R_0$, and current source 639.

Compared to the embodiment of ramp control circuit 402 shown in FIG. 4, in ramp control circuit 602, the offset circuit is positioned at a different location. In ramp control circuit 402, the offset circuit is arranged to provide the compensation up-slope component at a beginning stage of the circuit before the emulation voltage is provided to the transconductance amplifier. In ramp control circuit 602, however, the offset circuit is positioned at a late stage of the circuit, just before an input of the PWM comparator. Still, a function of the offset circuit is similar in ramp control circuit 602.

An input of buffer circuit 638 is coupled to node 620, where switch $SW_3$, switch $SW_4$, and track-and-hold circuit 616 are coupled. An output of buffer circuit 638 is coupled to one terminal of resistor $R_0$. Another terminal of resistor $R_0$ is coupled to an input of PWM comparator 604. Current source 639 is coupled between a supply voltage rail and the other terminal of resistor $R_0$. Similarly to ramp control circuit 402 of FIG. 4, current source 639 is arranged to provide a ramp current.

The offset circuit, which is coupled to the input of PWM comparator 604, is arranged to add a voltage to ramp voltage $V_{ramp}$ substantially equal to a compensation up-slope component. Because the offset circuit is coupled to ramp control circuit 602 at a late stage, ramp control circuit 602 operates as described in FIG. 2 substantially reducing excess up-slope. However, the offset circuit adds back the compensation up-slope component, including it in $V_{ramp}$. Buffer circuit 638 is arranged to prevent an effect of the addition on sampled voltage $V_{smpl}$ at a non-inverting input of transconductance amplifier 619.

The addition may be accomplished by generating $V_{OS}$ across the terminals of $R_O$ with the ramp current from current source 639. Similarly to ramp control circuit 402 of FIG. 4, current source 639 may be arranged to provide the ramp current with a substantially same frequency as a switching frequency of the PWM regulator. By pre-selecting a value of $R_O$ and a magnitude of the ramp current from current source 639, an amount of compensation up-slope component to be added may be predetermined.

After several clock cycles, the negative feedback loop and the offset circuit may adjust the emulated up-slope current such that $V_{ramp}$, includes a substantially reduced excess up-slope component while retaining the compensation up-slope component $V_{OS}$.

Figure 7:
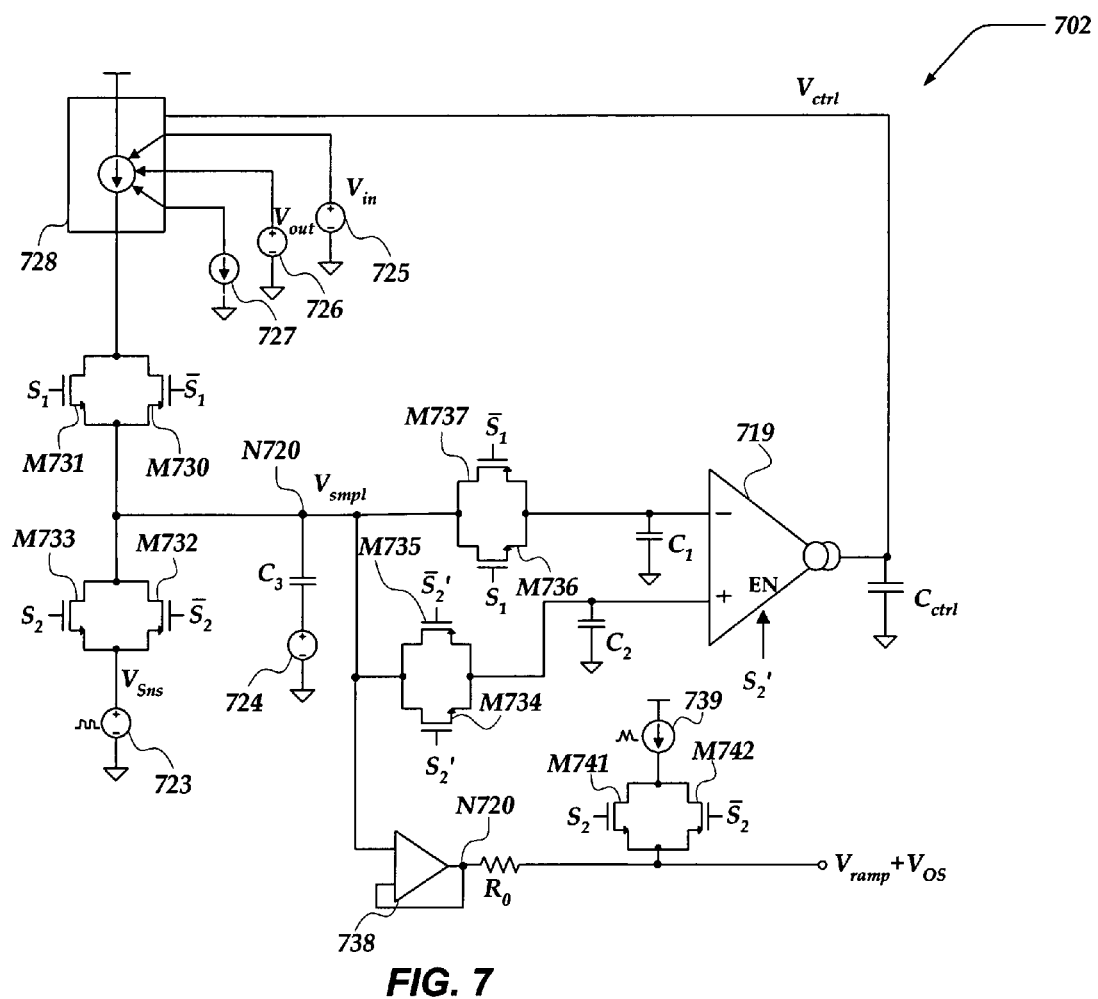
FIG. 7 schematically illustrates one embodiment of the ramp control circuit of FIG. 6.

FIG. 7 schematically illustrates ramp control circuit 702, which is one embodiment of ramp control circuit 602 of FIG. 6. ramp control circuit 702 includes current sources 728 and 727, voltage sources 725, 726, 723, and 724, transistors, M730–M737, capacitors $C_1$–$C_3$, and transconductance amplifier 719. ramp control circuit 702 additionally includes an offset circuit comprising buffer circuit 738, resistor $R_O$, and current source 739.

Components of ramp control circuit 702 shown in FIG. 7 that are similarly named in FIG. 5 operate in substantially the same way as discussed above in conjunction with FIG. 5. Furthermore, an operation and an effect of the offset circuit comprising buffer circuit 738, resistor $R_O$, and current source 739 is described above in conjunction with FIG. 6.

FIG. 7 shows one embodiment of ramp control circuit 702. However, the invention is not limited to the exemplary circuit described above. Other embodiments may be implemented without departing from the spirit and scope of the invention. Moreover, FIG. 7 shows a particular arrangement of various components of ramp control circuit 702. In one embodiment, all of the components of ramp control circuit 702 may be included in the same chip. Alternatively, one or more of the components may be off-chip.

Figure 8:
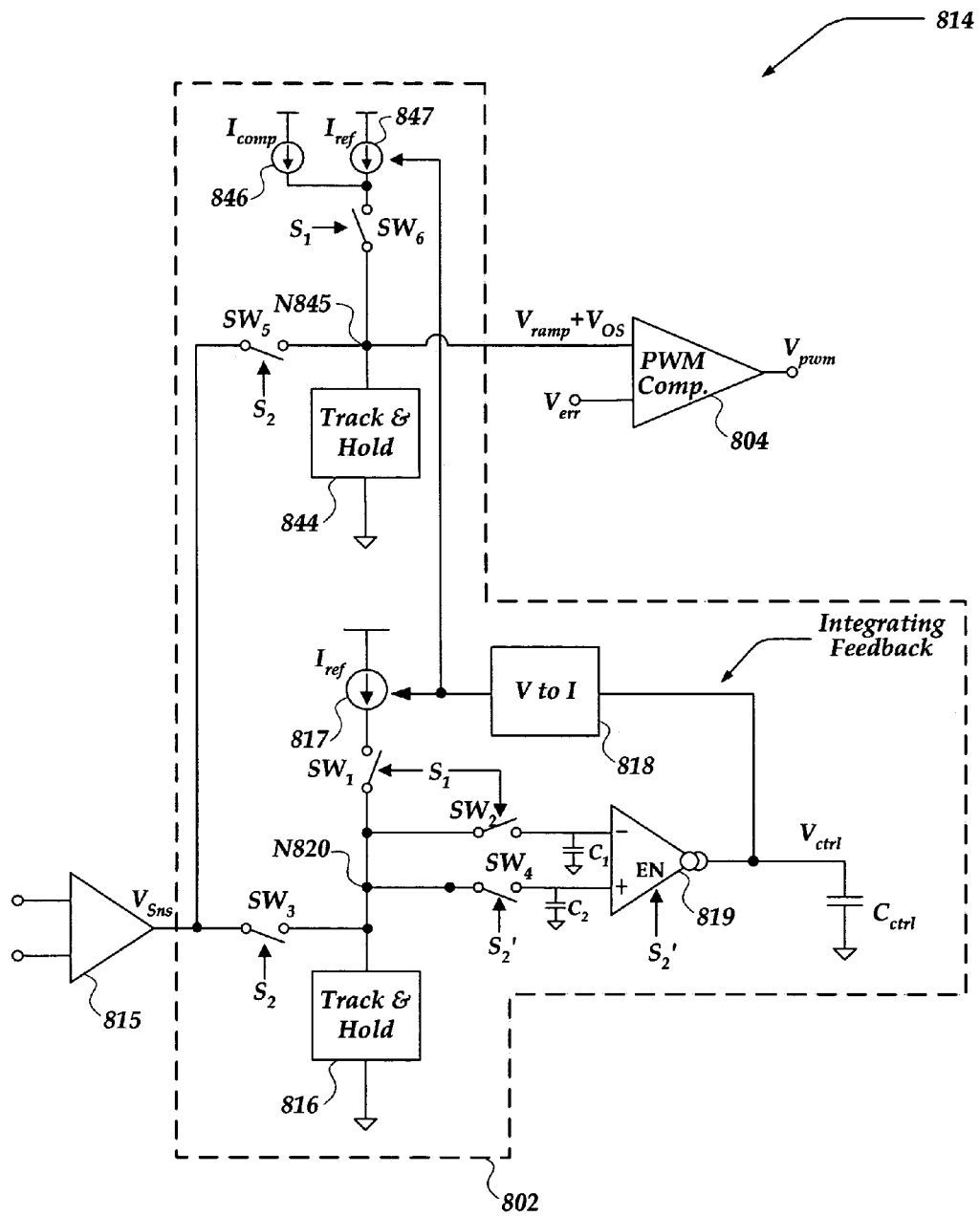
FIG. 8 illustrates a block diagram of a yet further embodiment of the ramp control and PWM comparator circuit of FIG. 1.

FIG. 8 illustrates a block diagram of a yet further embodiment of ramp control and PWM comparator circuit 814. Ramp control and PWM comparator circuit 814 may be implemented in current mode PWM switching regulator 100 of FIG. 1. Ramp control and PWM comparator circuit 814 includes amplifier 815, which is arranged to provide the sensed voltage, ramp control circuit 802, and PWM comparator 804.

Components of ramp control and PWM comparator circuit 814 and ramp control circuit 802 shown in FIG. 8 that are similarly named in FIG. 2 operate in substantially the same way as discussed above in conjunction with FIG. 2. ramp control circuit 802 includes, additionally, a second track-and-hold circuit 844, switches $SW_5$ and $SW_6$, second reference current source 846, and second controlled current source 847.

Switch $SW_5$ is arranged to provide sensed voltage $V_{Sns}$ to node N845 when it is closed. Track-and-hold circuit 844, switch $SW_6$ and an input of PWM comparator 804 are also coupled together at node N845. Second reference current source 846 and second controlled current source 847 are coupled in parallel to switch $SW_6$. Second controlled current source 847 is arranged to be controlled by V-I converter 818, which is also arranged to control controlled current source 817, similar to ramp control circuit 202 of FIG. 2.

As mentioned above, the remaining components of ramp control circuit 802 are arranged to operate substantially the same way as similarly named components of ramp control circuit 202 of FIG. 2.

In an operation, track-and-hold circuit 816, in conjunction with the integrating negative feedback loop, is arranged to integrate out both excess and compensation up-slope components of the emulated inductor current. However, second track-and-hold circuit 844, which is arranged to receive an additional current component from second reference current source 846, provides the additional compensation up-slope component to the input of PWM comparator 804.

As the figure shows, second reference current source 846 is not controlled by V-I converter 818. Therefore, a value of $I_{comp}$ provided by second reference current source 846 may be predetermined to correspond to the compensation up-slope component of the emulated inductor current. Accordingly, the input of PWM comparator 804 may receive $V_{ramp}+V_{OS}$, where $V_{OS}$ corresponds to the compensation up-slope component of the emulated inductor current.

After several clock cycles, the negative feedback loop and the offset circuit may adjust the emulated up-slope current such that $V_{ramp}$, includes a substantially reduced excess up-slope component while retaining the compensation up-slope component $V_{OS}$.

Figure 9:
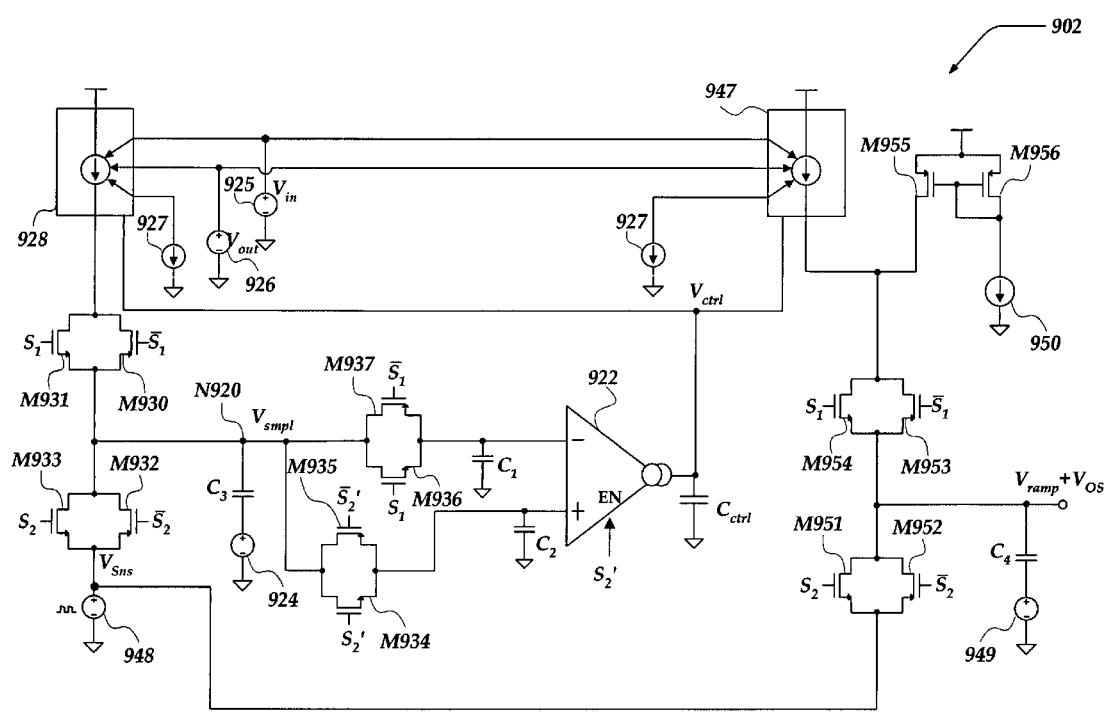
FIG. 9 schematically illustrates one embodiment of the ramp control circuit of FIG. 8.

FIG. 9 schematically illustrates ramp control circuit 902, which is one embodiment of rampcontrol circuit 802 of FIG. 8. Ramp control circuit 902 includes current sources 928 and 927, voltage sources 925, 926, 923, and 924, transistors, M930–M937, capacitors $C_1$–$C_3$, transconductance amplifier 719, and control capacitor $C_{ctrl}$.

Components of ramp control circuit 902 shown in FIG. 9 that are similarly named in FIG. 7 operate in substantially the same way as discussed above in conjunction with FIG. 7. Ramp control circuit 902 includes, additionally, current source 947, voltage sources 948–950, transistors M951–M956, and capacitor $C_4$.

Current source 947 represents second controlled current source 847 of FIG. 8, and is arranged to provide a corrected emulated Inductor current based on $V_{in}$, $V_{Out}$, and $V_{ctrl}$. Transistors M955 and M956 are arranged to operate as a current mirror and provide a reference current that corresponds to the compensation up-slope component of the emulated inductor current based on a ramp voltage from voltage source 950. Transistors M955, M956 and voltage source 950 are an embodiment of second reference current source 848 of FIG. 8.

Transistor pairs M951–M952 and M953–M954 are embodiments of switches $SW_5$ and $SW_6$, respectively. The transistor pairs include a PMOS transistor and an NMOS transistor that are coupled together at a drain terminal and at a source terminal, with a corresponding timing signal provided to a gate terminal of each transistor of the transistor pair. M951 and 952 are arranged to receive timing signal $S_2$. M953 and 954 are arranged to be activated based on timing signal $S_1$. When the corresponding timing signal has a high logic value, the switches are closed.

Voltage source 948 represents sensed voltage $V_{Sns}$ from a switch circuit of the PWM regulator. Capacitor $C_4$ and voltage source 949 are an embodiment of track-and-hold circuit 844. An operation of ramp control circuit 902 is substantially similar to an operation of ramp control circuit 802, which has been described above in conjunction with FIG. 8.

While ramp control circuit 902 is shown employing MOSFET transistors and references to MOSFET technology are made throughout the specification, claims, and other figures, other technologies such as Bipolar Complementary Metal Oxide Semiconductor (BiCMOS), Heterojunction Bipolar Transistor (HBT), Metal Semiconductor Field Effect Transistor (MESFET), and Bipolar Junction Transistor (BJT) may also be implemented without departing from the scope or spirit of the invention.

FIG. 9 shows one embodiment of ramp control circuit 902. However, the invention is not limited to the exemplary circuit described above. Other embodiments may be implemented without departing from the spirit and scope of the invention. Moreover, FIG. 9 shows a particular arrangement of various components of ramp control circuit 902. In one embodiment, all of the components of ramp control circuit 902 may be included in the same chip. Alternatively, one or more of the components may be off-chip.

FIG. 10 illustrates timing diagram 1000 of various waveforms involved in an operation of a ramp control circuit such as ramp control circuit 102 of FIG. 1.

Timing diagram 1000 illustrates waveforms $S_1$ and $S_2$ for triggering of switches in a ramp control circuit; actual inductor current $I_{ind\_act}$; uncorrected emulated ramp voltage $V_{emu1}$, with only compensation up-slope component added; uncorrected emulated ramp voltage $V_{emu2}$ with both compensation up-slope and excess up-slope added; corrected emulated ramp voltage $V_{ramp1}$, with excess up-slope component corrected; and corrected emulated ramp voltage $V_{ramp2}$, with both compensation up-slope and excess up-slope component corrected.

$S_1$ and $S_2$ represent triggering of switches $SW_1$–$SW_4$ in ramp control circuits 202, 402, and 602, and switches $SW_1$–$SW_6$ in ramp control circuit 802. Upon triggering of switch $SW_1$ and $SW_2$, (also $SW_6$ in ramp control circuit 802) a down-slope of inductor current ends and an up-slope begins. Compensation up-slope component ($V_{OS}$ in $V_{ramp1}$ and $V_{ramp2}$) is added during a closed state of $SW_1$ (also $SW_6$ in ramp control circuit 802) as shown by $S_2$ in FIG. 10. Similarly, excess up-slope component ($V_{excs}$ in $V_{ramp1}$ and $V_{ramp2}$) is added during the closed state of $S_W$.

$I_{ind\_act}$ has a saw-tooth shape that is triggered by $S_1$. Uncorrected emulated ramp voltage $V_{emu1}$ is similar to $I_{ind\_act}$ with compensation up-slope component added. $V_{emu2}$ includes both compensation up-slope and excess up-slope components.

When correction is implemented according to embodiments of the present invention as shown in FIG'S. 4, 6, and 8, excess up-slope component of ramp voltage $V_{ramp1}$ may be reduced by an integrating negative feedback loop over several cycles, but the compensation up-slope component $V_{OS}$ retained.

When correction is implemented according to another embodiment of the present invention as shown in FIG. 2, both excess up-slope component and compensation up-slope components of ramp voltage $V_{ramp2}$ may be reduced by the integrating negative feedback loop over several cycles.

The above specification, examples and data provide a description of the manufacture and use of the composition of the invention. Since many embodiments of the invention can be made without departing from the spirit and scope of the invention, the invention also resides in the claims hereinafter appended.

We claim:

1. A circuit for voltage regulation, comprising:
a switching circuit that is arranged to receive an input voltage and a ramp voltage and provide a regulated output voltage based on the input voltage and the ramp voltage;
a feedback circuit that is arranged to receive the regulated output voltage and provide an error voltage;
a Pulse Width Modulation (PWM) comparator circuit that is arranged to receive a ramp voltage and the error voltage and provide the PWM voltage based on a comparison of the ramp voltage and the error voltage;
a ramp control circuit that is arranged to receive a sensed voltage based on a down-slope actual inductor current, a first timing signal, and a second timing signal, and to provide the ramp voltage to the PWM comparator; and
a current sense circuit that is operable to sense a current across a synchronous switch of the switching circuit, and to provide the sensed voltage at a current sense node based on the sensed current, wherein the ramp control circuit includes:
a switch that is coupled between the current sense node and a capacitor node, wherein the switch is operable to close if the synchronous switch is closed, and to open if the synchronous switch is open;
a capacitor that is coupled to the capacitor node, wherein the capacitor voltage is provided by the capacitor at the capacitor node;
a current source circuit that is operable to provide a current that is substantially proportional to a difference between the input voltage and the regulated output voltage; and
an integrating feedback loop that is coupled to the current source circuit.

2. A circuit for voltage regulation, comprising:
a switching circuit that is arranged to receive an input voltage and a ramp voltage and provide a regulated output voltage based on the input voltage and the ramp voltage;
a feedback circuit that is arranged to receive the regulated output voltage and provide an error voltage;
a Pulse Width Modulation (PWM) comparator circuit that is arranged to receive a ramp voltage and the error voltage and provide the PWM voltage based on a comparison of the ramp voltage and the error voltage; and
a ramp control circuit that is arranged to receive a sensed voltage based on a down-slope actual inductor current, a first timing signal, and a second timing signal, and to provide the ramp voltage to the PWM comparator, wherein the ramp control circuit comprises:
a transconductance amplifier that is arranged to receive a sampling voltage and an adjusted emulation voltage, and to provide a control current based on a comparison of the sampling voltage and the adjusted emulation voltage;
a control capacitor that is arranged to be charged by the control current, and to provide a control voltage based on the control current;
an integrating negative feedback circuit that is arranged to receive the control voltage and to provide the adjusted emulation voltage based on the control voltage;
a first switch and a second switch that are arranged to provide the adjusted emulation voltage to an inverting input of the transconductance amplifier based on the first timing signal;
a track-and-hold circuit that is arranged to receive the sensed voltage and provide a sampled voltage based on the sensed voltage;

a third switch that is arranged to close based on the second timing signal, and to provide the sensed voltage to the track-and-hold circuit; and a fourth switch that is arranged to close based on a third timing signal, and to provide the sampled voltage to a non-inverting input of the transconductance amplifier, wherein the third timing signal is a one-shot signal that is determined based on a rising edge of the second timing signal.

3. The circuit of claim 2, wherein the integrating negative feedback circuit comprises:

a voltage-to-current converter; and a controlled current source, wherein the controlled current source is arranged to adjust a reference current based on an output of the voltage-to-current converter such that an excess up-slope component and a compensation up-slope component of an emulated inductor current are substantially reduced.

4. A circuit for voltage regulation, comprising:

a switching circuit that is arranged to receive an input voltage and a ramp voltage and provide a regulated output voltage based on the input voltage and the ramp voltage;

a feedback circuit that is arranged to receive the regulated output voltage and provide an error voltage;

a Pulse Width Modulation (PWM) comparator circuit that is arranged to receive a ramp voltage and the error voltage and provide the PWM voltage based on a comparison of the ramp voltage and the error voltage; and a ramp control circuit that is arranged to receive a sensed voltage based on a down-slope actual inductor current, a first timing signal, and a second timing signal, and to provide the ramp voltage to the PWM comparator, wherein the ramp control circuit includes an integrating negative feedback circuit, and wherein the integrating negative feedback circuit includes:

a voltage-to-current converter; and a controlled current source, wherein the controlled current source is arranged to adjust a reference current based on an output of the voltage-to-current converter such that an excess up-slope component and a compensation up-slope component of an emulated inductor current are substantially reduced, wherein the adjusted emulation voltage is determined based on the adjusted reference current.

5. A circuit for voltage regulation, comprising:

a switching circuit that is arranged to receive an input voltage and a ramp voltage and provide a regulated output voltage based on the input voltage and the ramp voltage;

a feedback circuit that is arranged to receive the regulated output voltage and provide an error voltage;

a Pulse Width Modulation (PWM) comparator circuit that is arranged to receive a ramp voltage and the error voltage and provide the PWM voltage based on a comparison of the ramp voltage and the error voltage; and a ramp control circuit that is arranged to receive a sensed voltage based on a down-slope actual inductor current, a first timing signal, and a second timing signal, and to provide the ramp voltage to the PWM comparator, wherein the ramp control circuit includes an integrating negative feedback circuit, and wherein the integrating negative feedback circuit includes:

a voltage-to-current converter; and a controlled current source, wherein the controlled current source is arranged to adjust a reference current based on an output of the voltage-to-current converter such that an excess up-slope component and a compensation up-slope component of an emulated inductor current are substantially reduced, wherein the voltage-to-current converter and the controlled current source are arranged to:

receive a reference current from a constant current source;

receive a first current from a transconductance converter that is arranged to convert the control voltage to the first current;

include an emulation current circuit that is arranged to adjust the reference current by at least one of subtracting the excess up-slope component and the compensation up-slope component based on the first current, and scaling a peak value of the reference current based on the first current such that the excess up-slope component and the compensation up-slope component are substantially reduced, wherein the adjusted reference current is proportional to a difference between the input voltage and the output voltage.

6. The circuit of claim 3, wherein the first, the second, the third, and the fourth switches comprise a PMOS transistor and an NMOS transistor that are coupled together at a drain terminal and at a source terminal, and a corresponding complementary timing signal is provided to a gate terminal of each transistor such that the switches are closed if the corresponding timing signal has a high logic value for the NMOS transistor and a low logic value for the PMOS transistor.

7. The circuit of claim 3, further comprising a first offset circuit that is coupled between the track-and-hold circuit and the second switch such that an offset voltage corresponding to the compensation up-slope component of the emulated inductor current is added to the adjusted emulation voltage.

8. The circuit of claim 7, wherein the first offset circuit comprises:

a first buffer circuit that is coupled to the track-and-hold circuit;

a first resistor circuit that is coupled to an output of the first buffer circuit at a first node and to the second switch at a second node; and a first current source that is coupled between the second node and a ground, wherein the first current source is arranged to provide a sawtooth-shaped ramp current.

9. The circuit of claim 8, wherein a value of the first resistor circuit and the first current source are pre-selected such that a voltage at the second node includes a difference of the adjusted emulation voltage and a compensation voltage that corresponds to the compensation up-slope component of the emulated inductor current.

10. The circuit of claim 3, further comprising a second offset circuit that is coupled between the track-and-hold circuit and an input of the PWM comparator circuit such that an offset voltage corresponding to the compensation up-slope component of the emulated inductor current is added to the ramp voltage.

11. The circuit of claim 10, wherein the second offset circuit comprises:

a second buffer circuit that is coupled to the track-and-hold circuit;

a second resistor circuit that is coupled to an output of the second buffer circuit at a first node and to the input of the PWM comparator circuit at a third node; and a second current source that is coupled between a supply voltage rail and the third node, wherein the second current source is arranged to provide a sawtooth-shaped ramp current.

12. The circuit of claim 11, wherein a value of the second resistor circuit and the second current source are pre-selected such that a voltage at the third node includes a sum of the ramp voltage and a compensation voltage that corresponds to the compensation up-slope component of the emulated inductor current.

13. The circuit of claim 3, further comprising a compensation circuit that is coupled in parallel to the track-and-hold circuit and arranged to provide an input to the PWM comparator circuit such that an offset voltage corresponding to the compensation up-slope component of the emulated inductor current is added to the ramp voltage.

14. A circuit for voltage regulation, comprising:
a switching circuit that is arranged to receive an input voltage and a ramp voltage and provide a regulated output voltage based on the input voltage and the ramp voltage;
a feedback circuit that is arranged to receive the regulated output voltage and provide an error voltage;
a Pulse Width Modulation (PWM) comparator circuit that is arranged to receive a ramp voltage and the error voltage and provide the PWM voltage based on a comparison of the ramp voltage and the error voltage;
a ramp control circuit that is arranged to receive a sensed voltage based on a down-slope actual inductor current, a first timing signal, and a second timing signal, and to provide the ramp voltage to the PWM comparator, wherein the ramp control circuit includes a track-and-hold circuit and an integrating negative feedback circuit, and wherein the integrating negative feedback circuit includes:
a voltage-to-current converter; and
a controlled current source, wherein the controlled current source is arranged to adjust a reference current based on an output of the voltage-to-current converter such that an excess up-slope component and a compensation up-slope component of an emulated inductor current are substantially reduced; and
a compensation circuit that is coupled in parallel to the track-and-hold circuit and arranged to provide an input to the PWM comparator circuit such that an offset voltage corresponding to the compensation up-slope component of the emulated inductor current is added to the ramp voltage, wherein the compensation circuit comprises:
a fifth switch that is arranged to provide the sensed voltage to a fourth node based on the second timing signal, wherein an input of the PWM comparator circuit is also coupled to the fourth node;
a third current source coupled through a sixth switch to the fourth node, and that is substantially similar to the first current source;
a fourth current source that is coupled in parallel to the third current source, and that is arranged to be controlled by the voltage-to-current converter; and
a second track-and-hold circuit that is coupled to the fourth node, wherein the second track-and-hold circuit is arranged to provide a compensation voltage to the fourth node.

15. The circuit of claim 14, wherein a voltage at the fourth node includes a sum of the ramp voltage and a compensation voltage that corresponds to the compensation up-slope component of the emulated inductor current.

16. A method for providing a regulated voltage with based on an emulated inductor current, the method comprising:
receiving an input voltage, a first timing signal, and a second timing signal; and
regulating the input voltage to provide a regulated output voltage, wherein regulating the input voltage includes:
determining a sensed voltage based on sensing a flywheel current;
receiving a sensed voltage based on the second timing signal;
sampling sensed voltage;
providing the sampled voltage to a non-inverting input of a transconductance amplifier based on the second timing signal;
receiving an output of the transconductance amplifier;
providing an integrating negative feedback to an inverting input of the transconductance amplifier based on the output of the transconductance amplifier, wherein providing the integrating negative feedback includes closing a pair of switches based on the first timing signal;
providing a ramp voltage and an error voltage that is based on the regulated output voltage to a PWM comparator; and
controlling the regulation of the input voltage based on a comparison of the ramp voltage and the error voltage.

17. The method of claim 16, wherein providing the ramp voltage comprises:
determining the ramp voltage based on the sampled voltage such that a compensation up-slope component and an excess up-slope component of the emulated inductor current are substantially reduced.

18. The method of claim 16, wherein providing the ramp voltage comprises:
determining the ramp voltage based on the sampled voltage such that an excess up-slope component of the emulated inductor current is substantially reduced and a compensation up-slope component of the emulated inductor current is retained by employing an offset circuit at the inverting input of the transconductance amplifier.

19. The method of claim 16, wherein providing the ramp voltage comprises:
determining the ramp voltage based on the sampled voltage such that an excess up-slope component of the emulated inductor current is substantially reduced and a compensation up-slope component of the emulated inductor current is retained by employing an offset circuit at the input of the PWM comparator.

20. The method of claim 16, wherein providing the ramp voltage comprises:
determining the ramp voltage based on the sampled voltage such that an excess up-slope component of the emulated inductor current is substantially reduced and a compensation up-slope component of the emulated inductor current is retained by employing two parallel track-and-hold circuits, wherein a first track-and-hold circuit is arranged to substantially reduce both up-slope components, and wherein the second track-and-hold circuit is arranged to add the compensation up-slope component to the PWM voltage.

21. A ramp control circuit for a current mode PWM switching regulator, the ramp control circuit comprising:
a transconductance amplifier;
a first capacitor that is arranged to track a sensed voltage based on a down-slope of an actual inductor current, and to provide a sampled voltage to a first input of the transconductance amplifier in response to a second timing signal; and
an integrating negative feedback circuit that is arranged to adjust an emulated inductor current based on an output of the transconductance amplifier and a first timing signal, wherein the integrating negative feedback circuit comprises at least one of:
a current source that is controlled by a voltage-to-current (V-I) converter that are coupled between an output of the transconductance amplifier and a second input of the transconductance amplifier such that a compensation up-slope component and an excess up-slope component of the emulated inductor current are substantially reduced;
the current source that is controlled by the V-I converter and an offset circuit, which are coupled between the output of the transconductance amplifier and the second input of the transconductance amplifier such that the compensation up-slope component of the emulated inductor is retained and the excess up-slope component of the emulated inductor current is substantially reduced;
the current source that is controlled by the V-I converter and and the V-I converter are coupled between the output of the transconductance amplifier and the second input of the transconductance amplifier, and the offset circuit is coupled between the non-inverting input of the transconductance amplifier and a PWM comparator such that the compensation up-slope component of the emulated inductor is retained and the excess up-slope component of the emulated inductor current is substantially reduced; or
a sample-and-hold circuit is coupled between a second current source that is controlled by the V-I converter, and the input of the PWM comparator is coupled to the sample-and-hold circuit such that the compensation up-slope component of the emulated inductor is retained and the excess up-slope component of the emulated inductor current is substantially reduced.

22. A circuit for voltage regulation, comprising:
a switching circuit that is arranged to receive an input voltage and a ramp voltage and provide a regulated output voltage based on the input voltage and the ramp voltage;
a comparator circuit that is arranged to receive a ramp voltage and an error voltage and provide a comparator output voltage based on a comparison of the ramp voltage and the error voltage, wherein the error voltage is based, at least in part, on the regulated output voltage; and
a ramp control circuit that is arranged to receive a sensed voltage based on a flywheel current, a first timing signal, and a second timing signal, and to provide the ramp voltage to the comparator, wherein the ramp control circuit includes:
a transconductance amplifier that is arranged to receive a current sense voltage and an adjusted emulation voltage, and to provide a control current based on a comparison of the current sense voltage and the adjusted emulation voltage, wherein the current sense voltage is based on the sensed flywheel current, and wherein the transconductance amplifier is operable to provide the control current to a control capacitor such that the control capacitor provides a control voltage based on the control current;
an integrating negative feedback circuit that is arranged to receive the control voltage and to provide the adjusted emulation voltage based on the control voltage;
a first switch and a second switch that are arranged to provide the adjusted emulation voltage to a first input of the transconductance amplifier based on the first timing signal;
a track capacitor that is arranged to receive the sensed voltage and provide a track capacitor voltage based on the sensed voltage;
a third switch that is arranged to close based on the second timing signal, and to provide the sensed voltage to the track capacitor, and
a fourth switch that is arranged to close based on a third timing signal, and to provide the track capacitor voltage to a second input of the transconductance amplifier, wherein the third timing signal is a one-shot signal that is determined based on the second timing signal.

\* \* \* \* \*

UNITED STATES PATENT AND TRADEMARK OFFICE
CERTIFICATE OF CORRECTION

PATENT NO. : 7,135,841 B1
APPLICATION NO. : 10/985477
DATED : November 14, 2006
INVENTOR(S) : Kenji Tomiyoshi et al.

It is certified that error appears in the above-identified patent and that said Letters Patent is hereby corrected as shown below:

Column 7; Line 60; After "$V_{smpl}$" delete ",".

Column 8; Line 39; Delete "inductore" and insert -- inductor --, therefor.

Column 10; Line 33; Delete "rampcontrol" and insert -- ramp control --, therefor.

Column 11; Line 45 (Approx.); Delete "$S_w$." and insert -- $SW_1$. --, therefor.

Column 17; Line 18; In Claim 21, after "and" delete "and". (Second Occurrence)

Signed and Sealed this

Twenty-second Day of May, 2007

JON W. DUDAS
*Director of the United States Patent and Trademark Office*